Nov. 14, 1967     J. T. MATSUOKA     3,352,542
MIXING MACHINE
Filed June 29, 1966
3 Sheets-Sheet 1

INVENTOR
JAMES T. MATSUOKA

Hoffmann and Yount
BY
ATTORNEYS

Nov. 14, 1967  J. T. MATSUOKA  3,352,542
MIXING MACHINE
Filed June 29, 1966  3 Sheets-Sheet 2

INVENTOR
JAMES T. MATSUOKA

BY *Hoffmann and Yount*
ATTORNEYS

INVENTOR
JAMES T. MATSUOKA
BY Hoffmann and Young
ATTORNEYS

United States Patent Office 3,352,542
Patented Nov. 14, 1967

3,352,542
MIXING MACHINE
James Toshio Matsuoka, Brecksville, Ohio, assignor to Stewart Bolling & Company, Inc., Cleveland, Ohio, a corporation of Ohio
Filed June 29, 1966, Ser. No. 561,420
10 Claims. (Cl. 259—41)

This invention relates to mixing machines for plastic material.

Plastic mixing machines of the type to which the present invention pertains have a mixing chamber including a discharge opening in the bottom thereof which is adapted to be sealingly closed by a door which is moved into and out of the discharge opening by a door supporting mechanism. The edge portions of the discharge opening have tapered seats which are adapted to be engaged by corresponding closure surfaces on the door to provide a tight seal and, due to inevitable irregularities in the dimensions of parts of the door supporting means, foreign matter on the seats and door surfaces engaged thereby, etc., it has been the practice to provide means by which the door may shift relative to the discharge opening as the door is closed on the seats so that the sealing surfaces at opposite sides of the opening are sealingly engaged.

A principal object of the present invention is the provision of a new and improved plastic mixing machine of the character mentioned having a discharge door supporting mechanism constructed of reliable and durable components and which effects a tight sealing of the discharge opening.

Another object of the invention is the provision of a new and improved plastic mixing machine including a mixing chamber having a discharge opening which has opposed tapered seats adapted to be engaged by tapering sealing surfaces on a door supported by pivot means at one side of the opening and which is forced into engagement with the opening seats by a power mechanism, the pivot means for the door providing a pivot which is movable in a direction transversely of the opposed discharge opening seats and yet rigidly supports the door with respect to the level of the plane of the discharge opening.

Further objects and advantages of the invention will be apparent from the following description of a preferred form thereof, reference being made to the accompanying drawings wherein.

Figure 1:
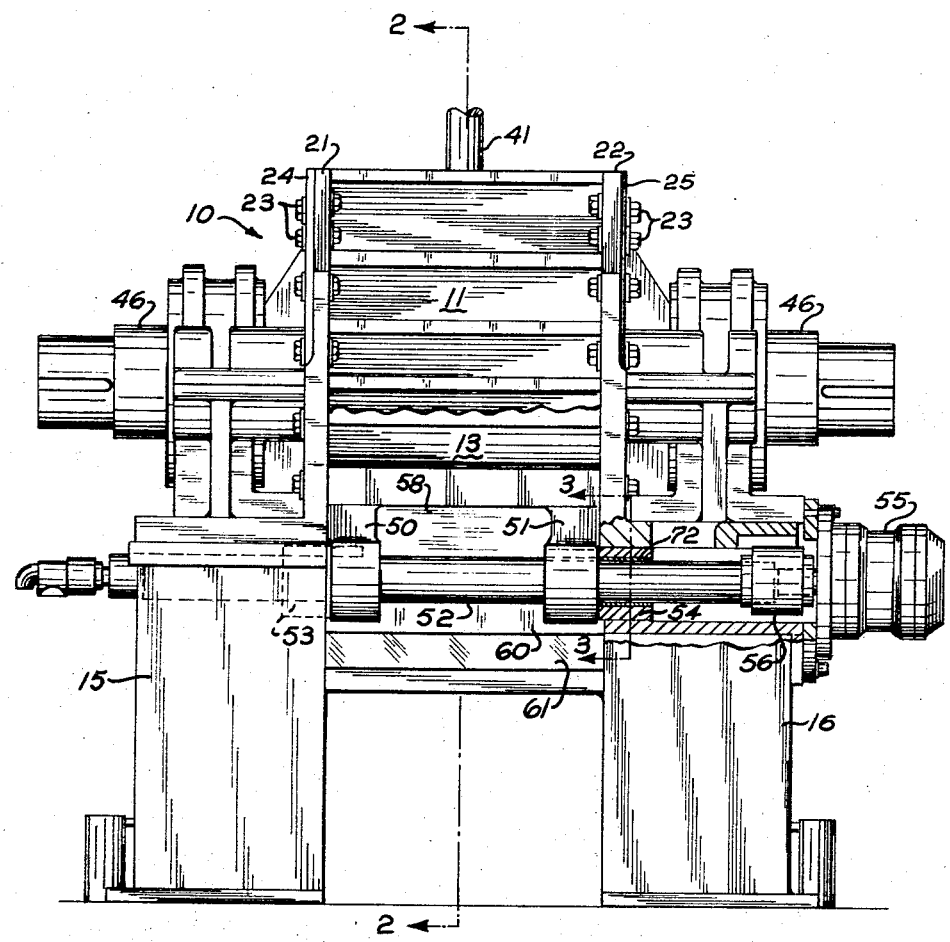
FIG. 1 is a side elevational view of a machine embodying the invention, certain parts being shown broken away.

Referring to the drawings, a preferred form of the present invention is shown embodied in a plastic mixing machine 10 comprising a mixing chamber 11 in which plastic material is mixed for processing thereof and the chamber is provided with a discharge opening 12 adapted to be closed by a door 13 during mixing operations. The door 13 is moved to open and close the discharge opening by door operating mechanism which assures proper alignment of the door in the opening.

The mixing machine 10 includes a support structure of two spaced box-like base sections 15, 16 which support the chamber 11 therebetween, and the door operating mechanism including a power operated door lock 20 for forcing the door to its closed position. The base sections 15, 16 are formed by metal plates welded together in a conventional manner and include upright side members 21, 22 to which the mixing chamber structure 11 is attached by bolts 23.

The chamber 11 is comprised of end plates 24, 25 between which two semi-cylindrical chamber members 26, 27 are attached, the open side edges of which members confront one another and are spaced apart to form an inlet or charging opening 28 and the outlet or discharge opening 12, which openings extend longitudinally from one end of the chamber to the other. The opposed edges 31, 32 of the discharge opening 12 extend parallel and slope upwardly and toward one another to form smooth tapered seats which are engaged by correspondingly smooth tapered closure surfaces 33, 34 along opposite sides of the door 13.

The charging opening 28 is closed by closure member 36 guided into closing position by two opposing vertical walls 37, 40 and is moved to and from its closure position by a rod 41 attached thereto by a pin 42, as shown. The rod 41 may be actuated by suitable means, such as a hydraulic piston, not shown.

Rotary mixing blades 42, 43 extend lengthwise of the chamber 11 and are attached to drive shafts 44, 45, respectively, which are journaled in suitable bearing structures 46 and extend axially of the respective chamber members 26, 27. The shafts 44, 45 are driven in a conventional manner, not shown or described.

The walls of the chamber 11 are jacketed by a structure 47 through which a fluid may be circulated to add or absorb heat from material in the chamber, as desired, and the closure member 36 is cored to provide passage of a heat exchange fluid therein to maintain the temperature of the walls thereof the same as that of the mixing chamber walls.

Figure 2:
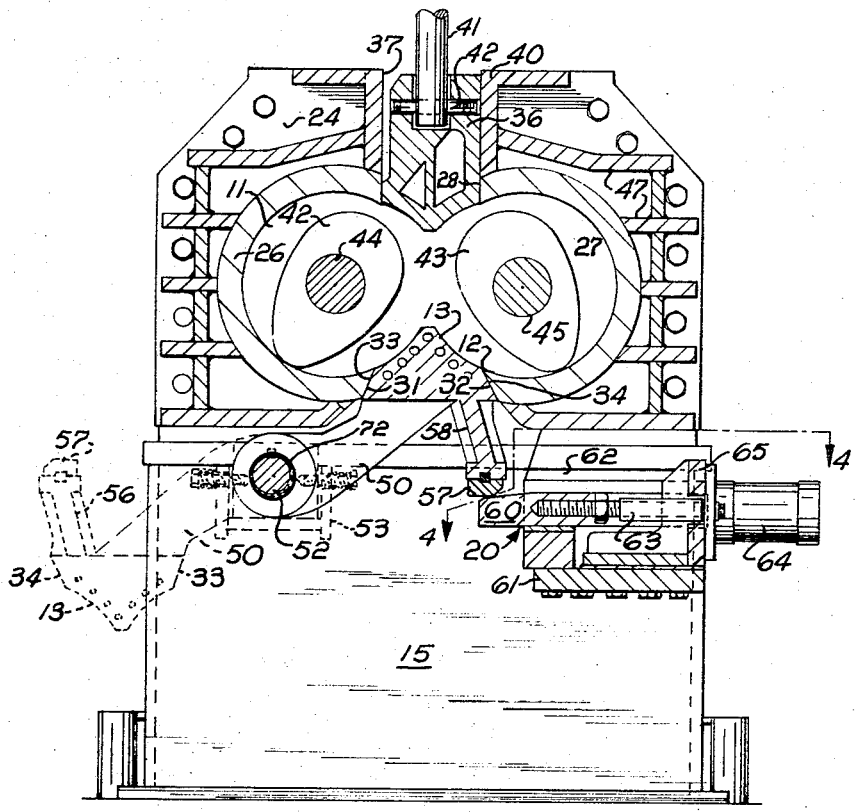
FIG. 2 is a sectional view of the machine shown in FIG. 1 taken substantially along line 2—2 of FIG. 1.
Figure 4:
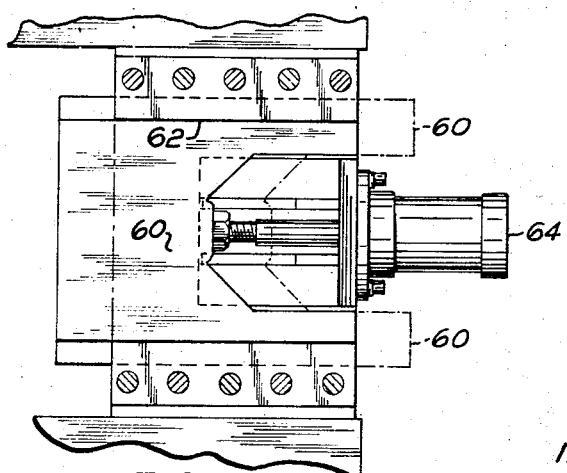
FIG. 4 is a fragmentary view taken substantially along line 4—4 of FIG. 2.

The door 13 is comprised of an elongated body, wedge-shaped in transverse section and having the side surfaces 33, 34 thereof sloped to correspond to the angular relationship of the seats 31, 32 at the discharge opening 12 so that the surfaces and seats are adapted to closely engage one another and form sealing joints when the door is properly closed. The door 13 is supported by two arms 50, 51 which project downwardly and laterally therefrom, as viewed in full lines in FIG. 2, and the outer ends of the arms are keyed to an operating shaft 52 which is journaled in bearings 53, 54 in the base sections 15, 16 and extends parallel to the discharge opening seats 31, 32. The shaft 52 is adapted to be oscillated by a suitable rotary type hydraulic motor 55 attached on the exterior of the base section 16 and is operable to swing the door between its open position, shown in broken lines in FIG. 2, and its closed position shown in full lines. The motor 55 is attached to the shaft 52 by a flexible coupling 56 so that the shaft can be rotated by the motor although it may shift laterally with respect to the motor while doing so.

The door 13 has a depending ledge or foot 58 formed integral therewith and which extends lengthwise of the door, and the lower edge of the foot is provided with a beveled member 57 extending therealong and which is adapted to be engaged by a U-shaped camming or lock plate 60 supported on the frame. The plate 60 extends substantially the length of the door foot 57 and is slidingly supported on a slide bar 61 and gib structure 62 secured between the base sections 15, 16. One end of a piston rod 63 is threaded into the plate 60 and the piston rod is integral with a piston which is reciprocated in a hydraulic motor cylinder 64 supported on a L-shaped bracket 65 secured to support structure 62. When the door 13 has been swung to its closed position by rotation of the shaft 52, the piston 63 is adapted to be driven outwardly of its cylinder and force the plate 60 beneath the beveled member 57 and sealingly wedge the door to the seats 31, 32. The hydraulic lines and controls for the motor 64 are not shown as they are well known to those skilled in the art.

To insure proper seating of the door surfaces 33, 34 on the corresponding discharge opening seats 31, 32, according to the present invention the bearings 53, 54 which support the shaft 52 are arranged to yieldingly shift from a neutral position in opposite directions transversely of the planes of the discharge opening seats so that the door 13 can shift laterally by the wedging action of either one of the surfaces 33 or 34 of the door engaging its complementary discharge opening seat 31 or 32 while the other surface is spaced from its seat. This action positions the door so that it engages both discharge opening seats with substantially equal force when the door is forced into the discharge opening by the locking plate 60. Thus, the door operating mechanism assures an effective seal between the door and the seats at the discharge opening although the initial positioning of the door in the opening by the rotation of shaft 52 may result in only one side of the door engaging its seat.

Figure 3:
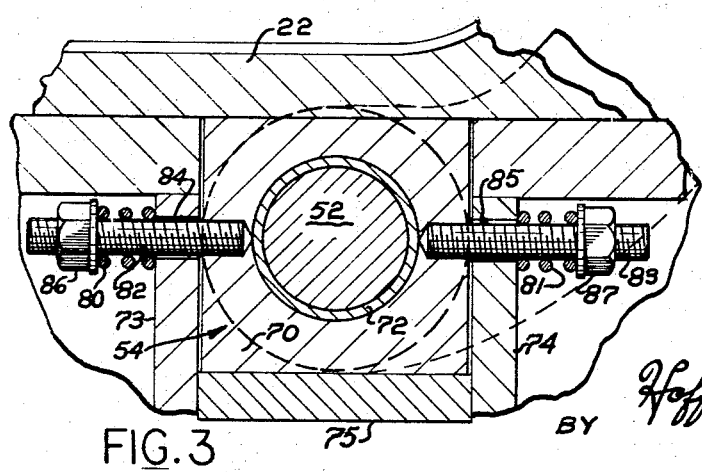
FIG. 3 is a fragmentary sectional view taken substantially along line 3—3 of FIG. 1 and drawn on a larger scale.

The bearings 53, 54 for supporting opposite end portions of the shaft are of like construction, and for the sake of clarity only bearing 54 is described in detail. Referring particularly to FIG. 3, the bearing 54 comprises a bushing block 70 having a central cylindrical bearing 72 of any suitable material in which the shaft is received. The block 70 is supported in a frame comprising plates 73, 74, 75. The bottom plate 75 forms an abutment for rigidly supporting the bearing block 70 at a given level and guides it in movements in opposite directions transversely of the planes of the discharge opening seats 31, 32. The side plates 73, 74 are spaced apart slightly greater than the width of the block 70 supported therebetween and form shoulders which permit limited lateral movements of the block on the plate 75. Upward movement of the block 70 is prevented by a lower edge portion of the side member 22.

The block 70 is yieldingly urged to a neutral position between the side plates 73, 74 by compression springs 80, 81 which surround oppositely disposed bolts 82, 83 extending through openings 84, 85 in the plates 73, 74 and which are threaded in axially aligned openings in opposite sides of the block 70. The outer ends of the springs 80, 81 abut nuts 86, 87 threaded on the bolts 82, 83 and the inner ends of the springs engage the plates 73, 74 so that the tension of the springs tends to draw the respective bolts outwardly. The tension on the springs are adjusted by turning the nuts on the bolts to cause the block 70 to be centered between the plates 73, 74 when the door 13 is in its open position, and the springs yield to an appreciable shifting effort applied to the block by reason of shifting of the door 13 as it is urged by the plate 60 to its closed position.

The bolt holes or openings 84, 85, through which the bolts 82, 83 project are larger than the bolts. From this construction and the other features of construction shown and described, it will be apparent that that the shaft 52 forms a pivot for the door 13 which can shift a limited amount in all directions parallel with the surface of plate 75 but which is rigidly supported by the plate in a given elevation relative to the seats 31, 32 of the discharge opening. Thus, when the door 13 is moved to its closed position by the shaft 52, should the door tend to seat improperly in the discharge opening for any reason, when the plate 60 forces the door into the opening the door can shift laterally into engagement with the other seat by the wedge forms of the door surfaces and the discharge opening seats, and the shaft 52 will move laterally with the door to permit seating of the door in the discharge opening.

Figure 5:
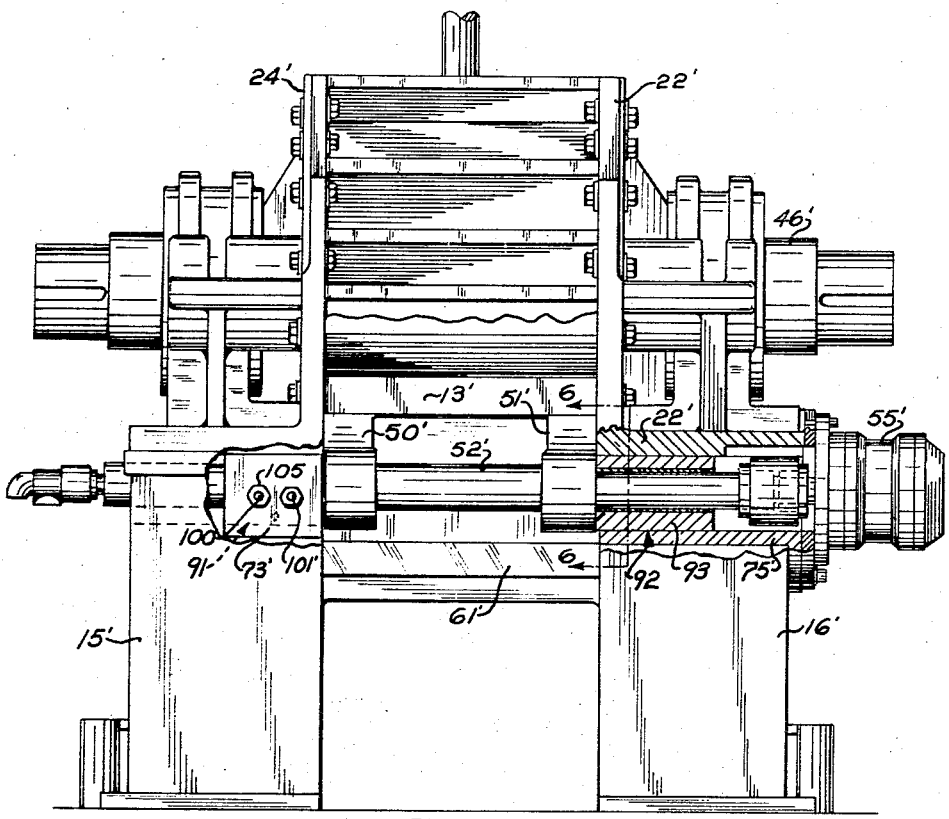
FIG. 5 is a side elevational view of a machine embodying another form of the invention, certain parts being shown broken away.
Figure 6:
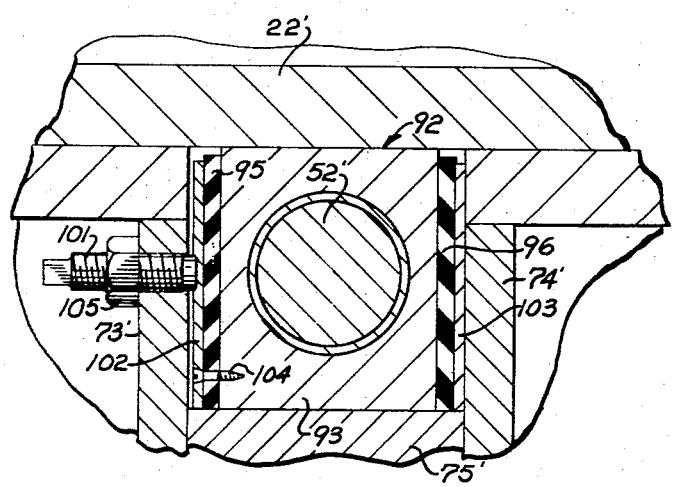
FIG. 6 is a fragmentary sectional view taken substantially along line 6—6 of FIG. 5.

Referring to FIGS. 5, 6, a plastic mixing machine 90 is shown which is similar to the machine 10, and which embodies a second form of the invention. For brevity, like parts thereof are referred to by the same reference characters bearing a prime. The shaft 52' for operating door 13' is supported by bearing means 91, 92, which are of somewhat different construction than bearings 53, 54. The two bearing means 91, 92, are substantially identical to one another and for sake of brevity only bearing means 92 is described in detail, and like parts of the two bearing means appearing in the drawings bear the same reference characters.

Bearing means 92 comprises a tubular bearing block or journal member 93, formed of a suitable bearing material, which is closely confined between bottom plate 75' and the overlying portion of end member 22' so that vertical movements of the block are nil. Opposite sides of the block 93 are confined between the side plates 73', 74' which are spaced apart to receive suitable resilient rubber pads 95, 96 between the side plates and the confronting sides of the block, respectively. This arrangement permits yielding lateral shifting of the bearing block and the shaft 52' supported thereby to permit centering of the door 13' on the opposite door sealing seats 31', 32' of the opening 12' in a manner like that described relative to the machine 10.

The bearing block 93 is initially positioned by a pair of screws 100, 101 which are threaded through openings in plate 73' and then engage a rigid thrust plate 102 interposed between the plate 73' and the pad 95, and by turning the screws in the plate 73', the normal position of the block 93 between the side plates 73', 74' can be determined. If necessary one or more shims, one of which is shown at 103, can be interposed between the pad 96 and plate 74' to effect proper alignment of the bearing block. Preferably, for ease of assembly, the pad 95 is secured to the plate 102 by a screw 104 extending through the pad and threaded into the plate. Lock nuts 105 are employed to secure the screws 100, 101 in place.

It will be apparent that the resiliency of the pads 95, 96, permit limited lateral shifting of the journal members 93 and the shaft 52' so that the door 13' is centered on the seats of the mixing chamber opening in the manner described with reference to the machine 10.

It is apparent that my improved door closing mechanism provides an effective door seal for a mixing chamber and the parts of the mechanism are relatively simple, inexpensive to manufacture and are at the same time durable and reliable in operation.

Although I have described but one form of the invention it is to be understood that other forms, modifications and adaptations could be made all falling within the scope of the claims which follow.

Having described my invention, what I claim is:

1. In a material mixing machine and the like, means forming a mixing chamber having a discharge opening in one of the walls thereof, means forming two elongated seating surfaces along opposite sides of said opening, a door movable into and out of registration with said opening, means forming closure surfaces along opposite sides of said door and adapted to engage said seats respectively when said door is moved into registration with said opening, means for moving said door to and from said seating surfaces along said two sides of said discharge opening comprising, arm means extending to one side of said door, bearing means at the extended portions of said arm means forming a pivot for said arms about an axis generally parallel to said seating surfaces along said discharge opening, said bearing means including a journal member rotating, rotatable supporting said arm means, abutment means rigidly supporting said journal member at a level fixed relative to said two seating surfaces and guiding said member for movement in opposite directions laterally with respect to said seating surfaces along said two sides of said discharge opening, and means to swing said door and arms about said pivot means to and from said discharge opening.

2. In a material mixing machine and the like as set forth in claim 1 further characterized by said bearing means comprising resilient means to yieldingly resist movement of said journal member along said abutment means.

3. In a material mixing machine and the like as set forth in claim 2, further characterized by said resilient means comprising shoulders at two opposite sides of said journal member and extending transversely of the plane of said abutment means, and a spring member disposed between each of said shoulders and said opposite sides of said journal member to yieldingly position said journal member on said abutment means.

4. In a material mixing machine and the like as set forth in claim 3 further characterized by said shoulders comprising stops to limit movement of said journal member on said abutment means.

5. In a material mixing machine and the like as set forth in claim 3 further characterized by including means to adjust the tension of at least one of said spring members.

6. In a material mixing machine and the like as set forth in claim 3 further characterized by said shoulder and abutment means comprising two spaced plates and a plate interconnecting said spaced plates, said interconnecting plate forming said abutment means and said spaced plates forming said shoulders, rod-like members projecting from the sides of said journal block facing said two spaced plates respectively, said two plates having apertures through which said rod-like members extend, a spring surrounding the portions of each of said rod-like members projecting beyond said two plates and engaging said plates about said openings therethrough, and shoulder means on said portions of said rod-like members engaged by the respective springs.

7. In a material mixing machine and the like as set forth in claim 6 further characterized by said shoulder means comprising nuts threaded on the respective rod-like members.

8. A material mixing machine as defined in claim 1, characterized by means to limit movement of said journal member in said opposite directions comprising rigid abutments on opposite sides of said journal member and a resilient rubber-like pad between one of said rigid abutments and said journal member.

9. A material mixing machine as defined in claim 1 characterized by means to limit movement of said journal member in said opposite directions comprising rigid abutments on opposite sides of said journal member and a resilient rubber-like pad interposed between each of said rigid abutments and opposite sides of said journal member.

10. A material mixing machine as defined in claim 9 further characterized by means to adjustably shift one of said rigid abutments towards and away from said journal member.

References Cited
UNITED STATES PATENTS

| | | | |
|---|---|---|---|
| 2,299,502 | 10/1942 | Schnuck et al. | 259—41 X |
| 2,939,616 | 6/1960 | Whittum et al. | |
| 2,994,100 | 8/1961 | Comes et al. | 259—41 X |
| 3,099,040 | 7/1963 | Matsuoka | 18—2 |

WILLIAM I. PRICE, *Primary Examiner.*